March 26, 1935. J. F. CULP 1,995,882
LUBRICATING SYSTEM
Filed June 30, 1933 3 Sheets-Sheet 1
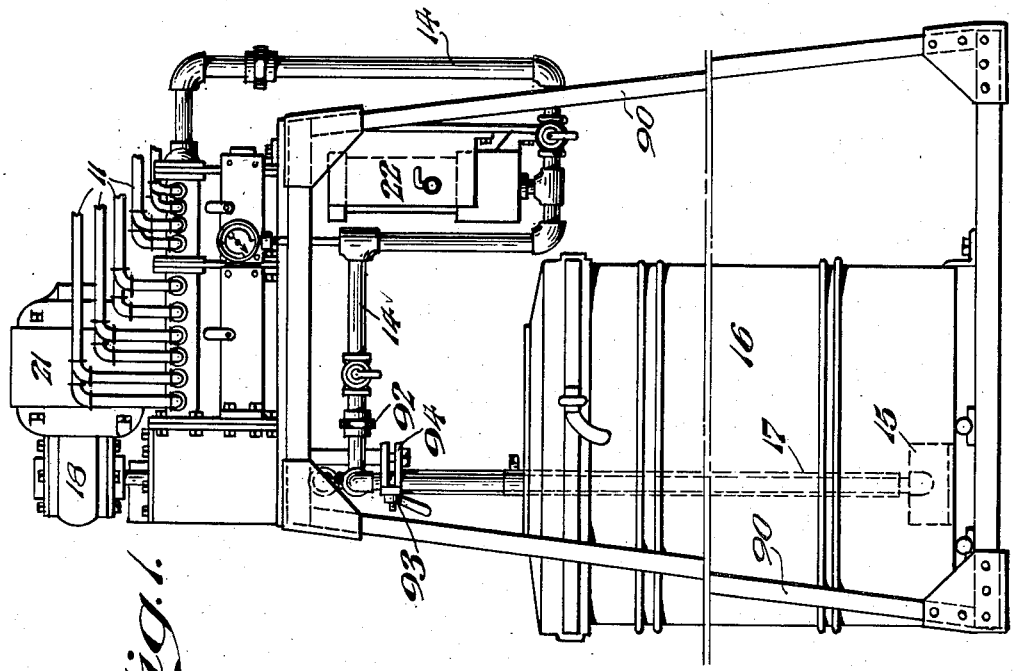
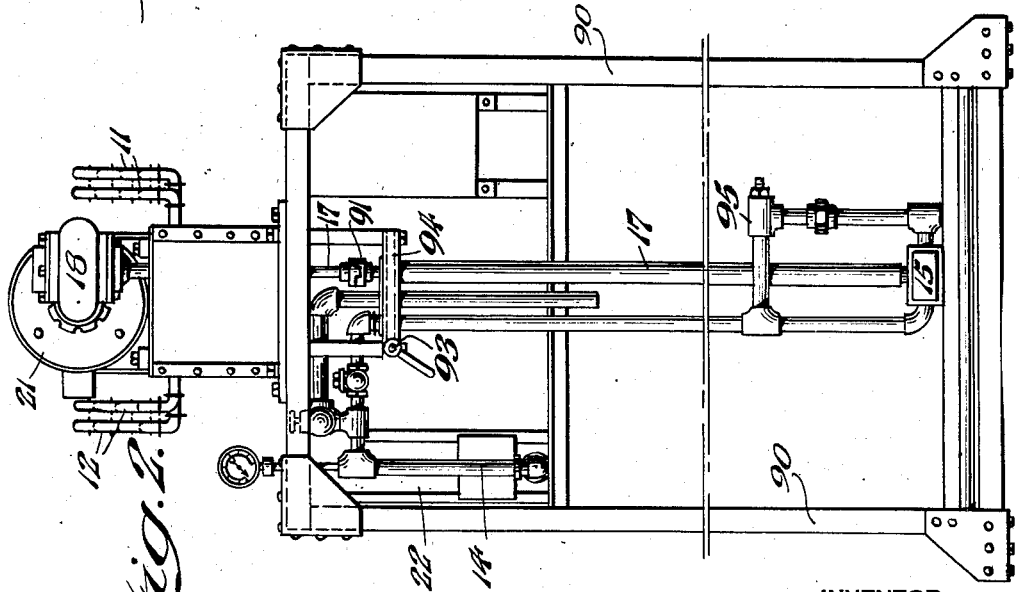
INVENTOR
JOHN F. CULP.
BY
ATTORNEY

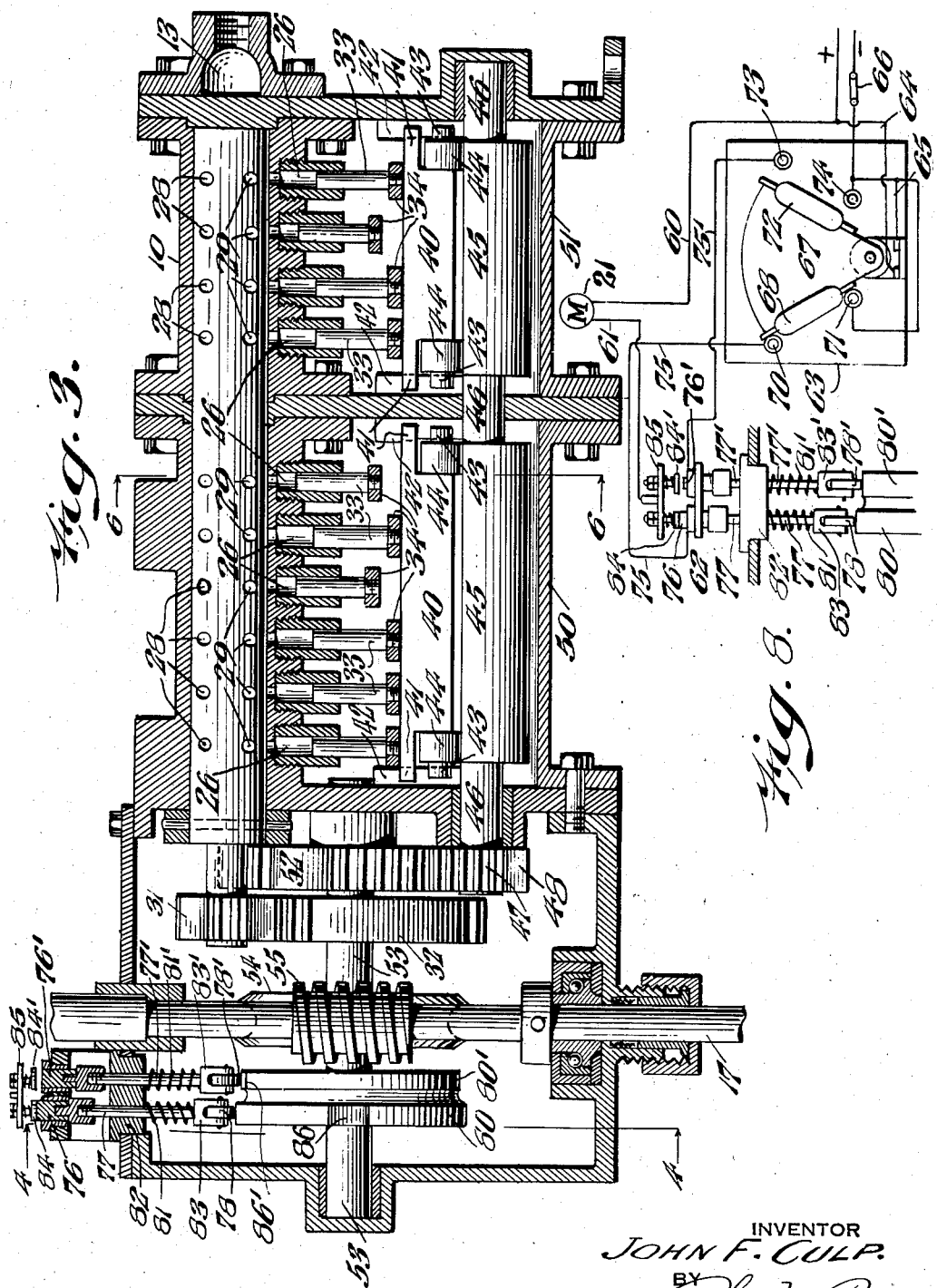

March 26, 1935.  J. F. CULP  1,995,882
LUBRICATING SYSTEM
Filed June 30, 1933  3 Sheets-Sheet 3
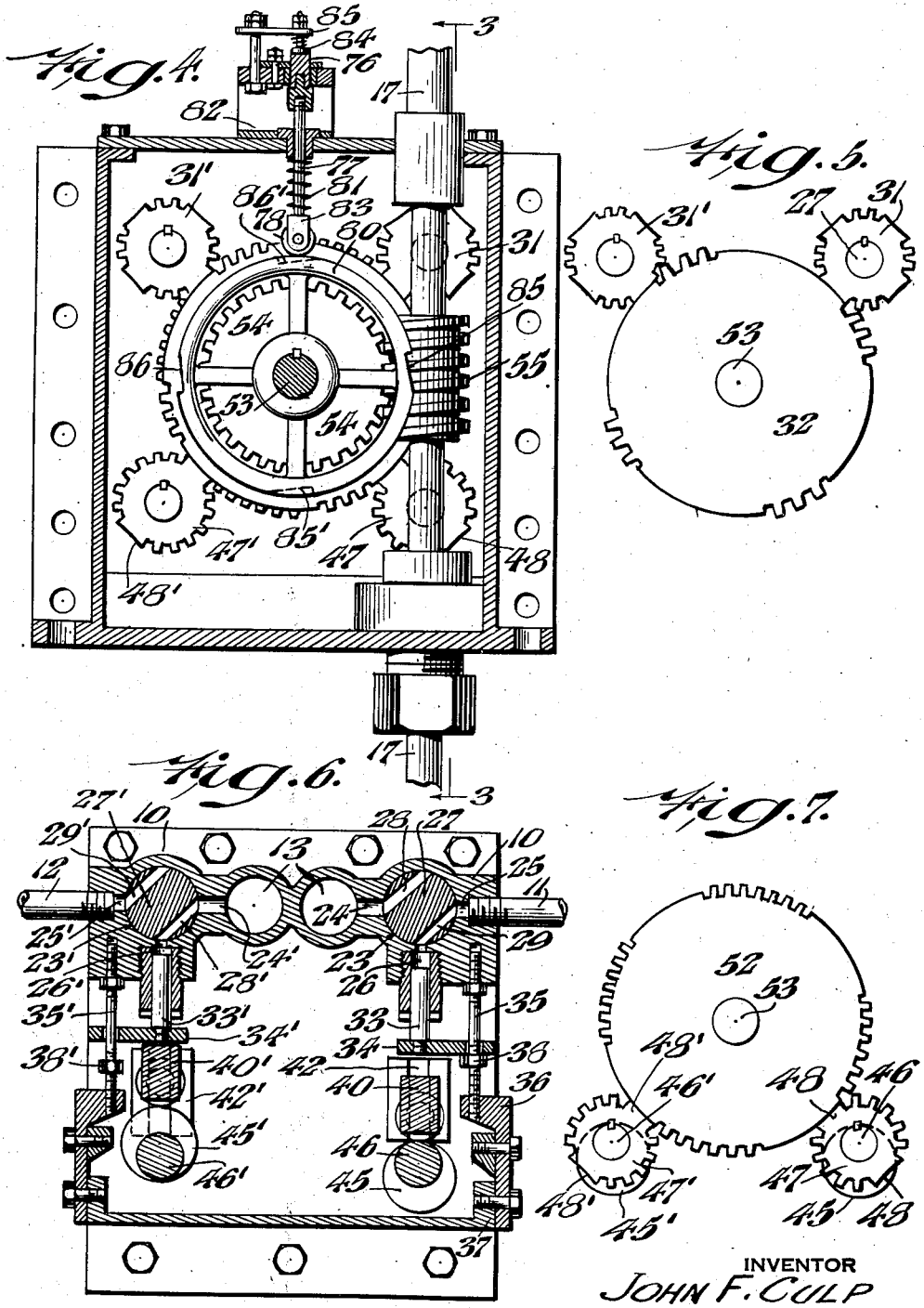
INVENTOR
JOHN F. CULP
BY
ATTORNEY Patented Mar. 26, 1935

1,995,882

UNITED STATES PATENT OFFICE 1,995,882

LUBRICATING SYSTEM

John F. Culp, Philadelphia, Pa., assignor to Ideal Lubricator Company, Philadelphia, Pa., a corporation of Delaware Application June 30, 1933, Serial No. 678,373

4 Claims. (Cl. 184—27)

The present invention relates to lubricating systems and more particularly to a lubricant supply control.

Some of the objects of the present invention are to provide an improved lubricating system; to provide a novel control mechanism for a lubricant supply; to provide a lubricating system wherein provision is made for supplying a definite measured quantity of lubricant to a bearing; to provide a lubricating system wherein lubricant is supplied to a bearing or bearings at predetermined intervals; to provide means for lubricating a plurality of bearings under such positive control that each receives the quantity of lubricant necessary for its efficient operation for a given interval of time; to provide a lubricating system wherein a plurality of bearings are supplied by lubricant from a common source in such a controlled manner that each may receive a different quantity of lubricant from the others; to provide a lubricant control for a plurality of bearings wherein separate adjusting means make possible an independent metering setting for each bearing control; to provide a positive control for a timing element of a lubricating system which makes it impossible to disturb or change the relative setting of one part with respect to another in the cycle of operation; and to provide other improvements as will hereinafter appear.

In the accompanying drawings Fig. 1 represents a side elevation of a lubricating system embodying one form of the present invention; Fig. 2 represents an end elevation of the same with the lubricant supply tank removed therefrom; Fig. 3 represents a section on line 3—3 of Fig. 4; Fig. 4 represents a section on line 4—4 of Fig. 3; Fig. 5 represents a detail showing the gears for actuating the control valves; Fig. 6 represents a section on line 6—6 of Fig. 3; Fig. 7 represents a detail of the gears for actuating the lubricant pumps; and Fig. 8 is a wiring diagram of the electric circuit of the system.

Referring to the drawings one form of the present invention consists of a base supported on uprights 90, a valve chest 10 being mounted on the base and being arranged to deliver lubricant, in this instance, to two sets of pipes 11 and 12 located respectively at opposite sides of the chest 10. Each pipe of each of the sets leads to and connects with one of a number of bearings to be lubricated and thus each bearing is supplied independently of the other bearings. The valve chest 10 is provided with a receiving chamber 13 to which the lubricant, such as grease, is supplied by a pipe 14 leading from the discharge of a pump 15 which is located in close proximity to the bottom of a tank 16 containing the lubricant to be used. The pump 15 is preferably of the rotary type and is driven by a shaft 17 here shown as extending vertically upward to project from the top of the tank 16 for connection to a gear reduction mechanism 18 arranged to be driven from the shaft of an electric motor 21. Intermediate the pump discharge and the valve chest 10 there is preferably a reservoir 22 in which air is held under the pressure of the discharged lubricant and the device serves to start the lubricant moving immediately the control of the valve chest 10 requires delivery of lubricant to the pipes 11 or 12.

For controlling the supply of lubricant to the pipes 11, the valve chest receiving chamber 13 communicates with a bore 23 by way of a plurality of ports 24. The discharge pipes 11 also communicate with the bore 23 by means of ports 25 respectively, and the arrangement is such that each port 24 supplies lubricant to its own port 25. The bore 23 is also in communication with a plurality of pump cylinders 26 (one for each pipe 11) and provision is made for simultaneously controlling all of the ports 24 and 25. In this instance this is done by a rotary cylindrical valve body 27 having two sets of passages 28 and 29 paralleling each other at opposite sides thereof, the set of passages 28 serving in one position of the body 27 to respectively connect all of the ports 24 with the cylinders 26, and in another position of the body 27 to respectively connect all of the cylinders 26 with the pipes 11. The set of passages 29 is likewise arranged to be turned to the two positions successively.

For rotating the valve body 27 periodically to bring about the successive lubricant intake relation and the lubricant discharge relation with the ports 24 and 26 and the ports 26 and 25, one end of the body 27 projects from the casing 10 and is of reduced diameter to receive a segmental gear 31 which is arranged to be rotated by a driving gear 32 of the intermittent type. Thus as here shown one revolution of the gear 32 results in four quarter revolutions of the gear 31 and with one rest period between each quarter turn. During one rest period the passages 28 are respectively connecting the ports 24 and the cylinders 26 and during the next rest period the cylinders 26 and the ports 25. During the third rest period the passages 29 are connecting the respective ports 24 with the cylinders 26, and during the fourth rest period the passages 29 are connecting the cylinder 26 respectively with the ports 25.

Thus during one revolution of the intermittent gear 32 there are two shots of lubricant delivered to all of the pipes 11.

In order to eject the lubricant from the cylinders 26, each is provided with a plunger 33 which is threaded at its outer end in a bar 34 which extends laterally to ride freely up and down upon a vertically disposed rod 35. Thus there is a row of the rods 35, each of which is threaded into the casing 10 at its upper end and is similarly fixed at its lower end in a plate 36 which is made fast to a fixed part 37. Each rod 35 has a nut 38 threaded thereon below the adjacent bar 34 and in the path thereof to act as a stop for the plunger 33 when the latter is being forced down by the pressure of the incoming lubricant. In this way the quantity of lubricant can be regulated at will for each cylinder 26 and a definite metered quantity delivered as and when desired. The working stroke of all of the plungers 33 is performed by a block 40 which has its ends 41 riding respectively in guide ways 42 which are fixed in a vertical position. Pins 43 project at opposite end portions of the block 40 to support respectively two rollers 44 which are supported upon the periphery of a cam 45 which is mounted upon an eccentric axis serving as a shaft 46. This shaft 46 is suitably journalled and is arranged to be periodically rotated by a segmental gear 47 having two rest dwells 48. In the present construction two separate lubricating units 50 and 51 are bolted together end to end, each of multiple pump type and the above description applies alike to either with like parts identified by like reference numerals. Motion is transmitted to the gear 47 by a driven intermittent gear 52 and the construction is such that the operating stroke of the plungers 33 is timed to coincide with the discharge positions of the ports or passages 28 and 29. In order to ensure this time relation the preferred construction is to mount the two intermittent gears 32 and 52 upon the same driven shaft 53 and to drive the latter by a worm gear 54 from a worm 55 which is keyed to the shaft 17.

It may here be stated that the parts for controlling the supply of lubricant to the pipes 12 at the opposite side of the valve casing 10 are identical with that just described for the pipes 11, so in order to avoid repetition all corresponding parts are indentified by an exponent, as for example valve body 27', passages 28' and 29', cylinders 26', etc. It should be noted, however, that the cam 45' is oppositely set with respect to the cam 45, the object being to have the cylinders for one set of discharge pipes discharging lubricant while the cylinders for the opposite set are filling. By this arrangement the load on the motor is lessened.

For the periodic operation of the motor 21 it is included in a circuit of which one conductor 60 leads directly to one pole of the source of current while the other conductor 61 passes through a double contact control switch 62 and also through an electric timer 63 of any standard type. The timer 63 is supplied with current by the leads 64 and 65 from the current supply line and it can be started or stopped by the proper positioning of a hand switch 66. As is well known in this type of apparatus an electric clock mechanism controls the oscillation of a segment 67 which carries a bridge contactor 68 at one side to electrically join or break contacts 70 and 71, and a like bridge contactor 72 at the other side to electrically join or break contacts 73 and 74. The contact 70 is connected by a conductor 75 to a plunger contactor 76 which is arranged to be reciprocated by a rod 77 having a wheel 78 journalled on the lower end thereof to ride on the face of a cam 80. A spring 81 is coiled about the rod 77 and is held under compression between a bearing block 82 and the bearing member 83 for the wheel 78. The plunger contactor 76 in its upward movement picks up a spring pressed contact 84 which is supported by and electrically connected to a conductor plate 85. This plate 85 is electrically joined to the conductor 61 leading to one terminal of the motor 21. In a like manner the contact 73 is connected by a conductor 75' to a second plunger contactor 76' which is arranged to be reciprocated by a rod 77' having a wheel 78' journalled on the lower end thereof to ride on the face of a cam 80'. A spring 81' is coiled about the rod 77' and is held under compression between the bearing block 82 and the bearing member 83' for the wheel 78'. The plunger contactor 76' in its upward movement picks up a spring pressed contact 84' which is supported by and electrically connected to the same plate 85 as is the contact 84. As will be presently described the two plunger contactors 77 and 77' are alternately raised and lowered so that when conductors 61 and 75 are connected the conductors 61 and 75' are disconnected and vice versa.

The function of the double contact control switch 62 is to ensure the stopping of the motor 21 as soon as one shot of lubricant has been ejected, as otherwise if the sole control was the electric timer and if this happened to be set for say, five minute interval operation, then the motor circuit would remain closed and too much lubricant supplied to the bearings. By the present mechanical contact control this undesirable condition is avoided and only the required amount of lubricant delivered for each operation of the timer. This control is obtained in the present instance by mounting the cams 80 and 80' upon the driven shaft 53 and providing two dwells 85 and 86 diametrically opposite to each other in the periphery of the cam 80, and two dwells 85' and 86' diametrically opposite to each other in the periphery of the cam 80'. The two cams 80 and 80' are fixed to the shaft 53 so that the diameter of cam 80 which passes through the dwells 85 and 86 is at right angles to the corresponding diameter of cam 80' which passes through the dwells 85' and 86'. Therefore at each quarter revolution of the shaft 53 one circuit to the motor 21 will be broken and another circuit to the motor 21 will be closed. Since, however, the circuit which is broken is always that closed by one of the contactors 68 or 72 the motor will immediately stop. Also the circuit referred to as closed is only closed at one point because it is open at the other point by the position of the other timer contactor, either 68 or 72 as the case may be.

In order that the lubricant tank 16 can be readily removed from its operative position within the frame 90, the drive shaft 17 is made in two lengths which are connected by a coupling 91 to permit one section to be disconnected from the other. Also a union 92 is located in the feed pipe 14 and which when uncoupled separates the tank piping from the control apparatus. A separable clamp 93 operating in conjunction with anchor straps 94 maintains the assembly rigidly connected except when the tank is to be removed and replaced. A relief valve 95 allows the lubricant to by-pass back to the pump when an excessive pressure happens to build up in the line.

In the operation of the system of the present invention each of the pumps 33 is adjusted for the proper stroke to deliver a given metered quantity of lubricant to the bearing which is to be supplied. This adjustment is done by setting the nuts 38 and 38' on the respective rods 35 and 35' to the correct position to stop the downward travel of the control plates 34 and 34' so that the intake stroke of the pumps is definitely fixed to give the required quantity of grease at each shot of any pump. With all connections made to the bearings through the pipes 11 and 12 and the timing device 63 set for the time period between shots of lubricant, the device is ready for operation and as soon as the timing device closes one of the motor circuits, such for example as connecting the contacts 70 and 71 as shown in Fig. 8, a circuit is closed by way of conductor 75, plunger contactor 76, contact 84, plate 85, conductor 61 and return conductor 60. This closing of the circuit between the contactor 76 and contact 84 is possible because the cam 80 is in the position to hold this contactor in its elevated contact closing position. The closing of this circuit starts the motor which actuates the pump shaft 17 to deliver lubricant under pressure to the pipe 14 and the reservoirs 13 of the valve chest. Also the starting of the motor causes the worm 55 to operate the worm gear 54 and turn the shaft 53 so that both of the gears 32 and 52 begin to turn. The rotation of the gear 32 turns segment 31 to bring one of the sets of passages either 28 or 29 into position to connect the pumps 26 with the ports 24, while the opposite segment gear 31' simultaneously rotates the rotary valve 27' so that one of the sets of passages either 28' or 29' connect the pumps 33' with the ports 25'. Since the gear 52 is initially set upon the shaft 53 so that the toothed portions operate the gear segments 47 and 47' after the gear segments 31 and 31' have completed a valve setting motion, it will be seen that the parts are now in position to cause the eccentric roller 45 to allow the plungers 33 to be forced out of the cylinders under the pressure of the incoming lubricant. While the plungers 33 are moving downward on the intake stroke, the cam 45' is raising the plungers 33' to eject the lubricant to the pipes 12. While this operation is taking place the two cams 80 and 80' are moving one-quarter turn and the cam 80 then reaches a position where the dwell 85 is beneath the roller 78 so that the latter drops under the influence of the spring 81 and breaks the circuit between the contactor 76 and the contact 84. During this quarter turn the contact roller 78' has travelled out of its dwell 86' and closed one point in the open circuit through the contactor 76' meeting the contact 84'. Since the contactors 76 and 76' are insulated one from the other the circuit by way of conductors 75 is broken and the circuit by way of conductors 75' is closed at one part but still open between the contacts 73 and 74. Thus the operating circuit of the motor is broken prior to the expiration of the time interval as set by the timing device 63 and the pump mechanism ceases to operate until another time interval has passed. When this occurs the device 63 automatically swings the contactor 68 away from the contacts 70 and 71 and brings the contactor 72 into engagement with the contacts 73 and 74. As this circuit has been closed through the contactor 76' and contact 84' in advance of this swing of the timing element the motor circuit is again closed and another cycle of operation takes place with the resultant ejecting of one shot of lubricant from each pump at one side of the valve chest, and thereafter the cams 80 and 81 again change the make and break relation of the contacts 84 and 84'.

It will now be apparent that a complete unitary system has been devised wherein one or more pumps for supplying lubricant can be operated to supply a given quantity of lubricant to a bearing or bearings and continue to do so periodically in accordance with a definite time as fixed by a timing element. Furthermore the arrangement is such that another pump or another set of pumps can be controlled by the same mechanism to operate alternately with respect to the first pump or first set of pumps in such a manner that when one pump or set is taking in a supply of grease the other pump or set of pumps is simultaneously discharging. Furthermore by providing a mechanical control for the electric circuits in addition to the time control electric means, the relative association of one part of the system with respect to another is maintained constant throughout the cycle of operations and the discharge of grease is limited to an exact quantity in a given time. In the foregoing the apparatus has been described as alternately discharging lubricant from the two sets of discharge pipes but it is to be understood that this is merely the preferred and more practical way of operating the system, but still it can be operated with the apparatus set so that both sets of pipes discharge simultaneously. It will further be noted that a different timing operation can be obtained for one set of pipes than for the other while using the same electric timing mechanism 63 and this can take place by omitting one or the other of the passages 28 and 29 in the valve body 27, and hence this will only act to discharge to the pipes 11 once to two discharge operations from the pipes 12.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A lubricating system comprising a lubricant receiving chamber having a plurality of outlets, a plurality of pumps having inlets respectively adjacent said outlets, a plurality of discharge pipes arranged adjacent the respective pumps, a rotary valve having ports therein for respectively connecting said pump inlets with said receiving chamber in one position, and for respectively connecting said pipes with said pumps in another position, means for simultaneously reciprocating all of said pumps, means for intermittently actuating said pump reciprocating means, and means for setting said valves in one position or the other between strokes of said pumps.

2. A lubricating system comprising a lubricant receiving chamber having a plurality of outlets, a plurality of pumps having inlets respectively adjacent said outlets, a plurality of discharge pipes arranged adjacent the respective pumps, a rotary valve having ports therein for respectively connecting said pump inlets with said receiving chamber in one position, and for respectively connecting said pipes with said pumps in another position, means for simultaneously reciprocating all of said pumps, means alternately actuating said pump reciprocating means and said valve operating means.

3. A lubricating system comprising a lubricant receiving chamber having a plurality of outlets, a plurality of pumps having inlets respectively adjacent said outlets, a plurality of discharge pipes arranged adjacent the respective pumps, a rotary valve having ports therein for respectively connecting said pump inlets with said receiving chamber in one position, and for respectively connecting said pipes with said pumps in another position, means for simultaneously reciprocating all of said pumps, means for bringing said valve to rest with said inlet ports and pumps respectively in communication, and means for causing said pump reciprocating means to function while said valves are at rest.

4. A lubricating system comprising a lubricant receiving chamber having a plurality of outlets, a plurality of pumps having inlets respectively adjacent said outlets, a plurality of discharge pipes arranged adjacent the respective pumps, a rotary valve having ports therein for respectively connecting said pump inlets with said receiving chamber in one position, and for respectively connecting said pipes with said pumps in another position, means for simultaneously reciprocating all of said pumps, means for bringing said valve to rest with said discharge ports and pumps respectively in communication, and means for causing said pump reciprocating means to function while said valves are at rest.

JOHN F. CULP.